(12) United States Patent
Saita

(10) Patent No.: US 12,233,736 B2
(45) Date of Patent: Feb. 25, 2025

(54) CHARGING CONTROL APPARATUS, MOVING BODY, CHARGING CONTROL SYSTEM, AND CHARGING CONTROL METHOD

(71) Applicant: HONDA MOTOR CO., LTD., Tokyo (JP)

(72) Inventor: Akira Saita, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 553 days.

(21) Appl. No.: 17/677,942

(22) Filed: Feb. 22, 2022

(65) Prior Publication Data
US 2022/0297565 A1    Sep. 22, 2022

(30) Foreign Application Priority Data
Mar. 19, 2021  (JP) ................................ 2021-045553

(51) Int. Cl.
| | |
|---|---|
| B60L 53/62 | (2019.01) |
| B60L 50/60 | (2019.01) |
| B60L 53/64 | (2019.01) |
| B60L 53/66 | (2019.01) |
| B60L 58/12 | (2019.01) |
| H02J 7/00  | (2006.01) |

(52) U.S. Cl.
CPC ............. *B60L 53/62* (2019.02); *B60L 50/60* (2019.02); *B60L 53/64* (2019.02); *B60L 53/665* (2019.02); *B60L 58/12* (2019.02); *H02J 7/0047* (2013.01); *H02J 7/0071* (2020.01); *H02J 7/00032* (2020.01)

(58) Field of Classification Search
USPC ........................................................ 320/109
See application file for complete search history.

(56) References Cited

U.S. PATENT DOCUMENTS

| | | | |
|---|---|---|---|
| 2012/0256588 A1* | 10/2012 | Hayashi | B60L 3/12 320/109 |
| 2017/0267116 A1* | 9/2017 | Lindemann | B60L 53/66 |
| 2018/0188332 A1* | 7/2018 | Newman | B60K 35/00 |
| 2022/0297565 A1* | 9/2022 | Saita | B60L 53/68 |

(Continued)

FOREIGN PATENT DOCUMENTS

| | | |
|---|---|---|
| JP | 2012-228165 A | 11/2012 |
| JP | 2013-090360 A | 5/2013 |

(Continued)

OTHER PUBLICATIONS

Office Action dated Feb. 7, 2023 issued over the corresponding Japanese Patent Application No. 2021-045553 with the English translation thereof.

*Primary Examiner* — Mohammed Alam
(74) *Attorney, Agent, or Firm* — Carrier, Shende & Associates P.C.; Joseph P. Carrier; Fulchand P. Shende

(57) ABSTRACT

With a charging control apparatus, first, a chargeable amount is acquired. Then, the charging control apparatus calculates a minimum SOC that is the lowest SOC needed by the vehicle for the following travel. Then, the charging control apparatus sets a target SOC that restricts deterioration of the battery and is greater than or equal to the minimum SOC. Alternatively, the charging control apparatus sets a target charging amount that restricts deterioration of the battery and is less than or equal to the chargeable amount.

14 Claims, 8 Drawing Sheets

(56) References Cited

U.S. PATENT DOCUMENTS

2023/0137357 A1\* 5/2023 Chopra ................. B60L 3/12
                                                    320/109
2023/0303091 A1\* 9/2023 You .................... B60L 53/65

FOREIGN PATENT DOCUMENTS

| JP | 2017-143634 A | 8/2017 |
| JP | 2018-064413 A | 4/2018 |

\* cited by examiner

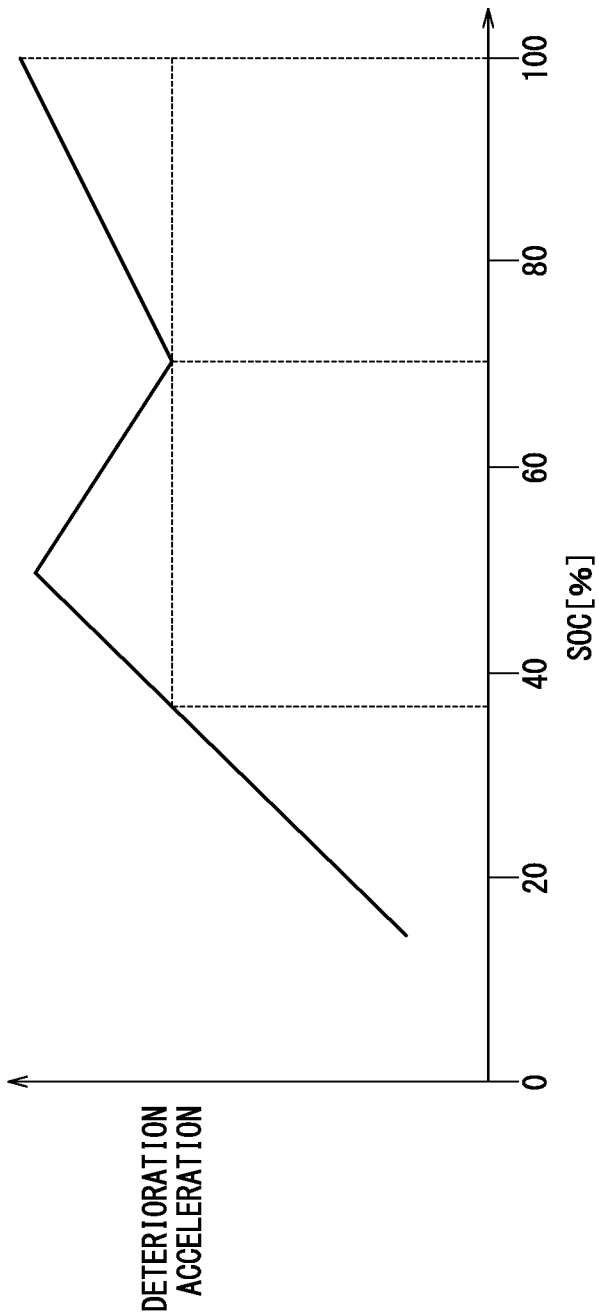

CHARGING CONTROL APPARATUS, MOVING BODY, CHARGING CONTROL SYSTEM, AND CHARGING CONTROL METHOD

CROSS-REFERENCE TO RELATED APPLICATIONS

This application is based upon and claims the benefit of priority from Japanese Patent Application No. 2021-045553 filed on Mar. 19, 2021, the contents of which are incorporated herein by reference.

BACKGROUND OF THE INVENTION

Field of the Invention

The present invention relates to a charging control apparatus, a moving body, a charging control system, and a charging control method.

Description of the Related Art

JP 2012-228165 A discloses charging a battery loaded in an electric automobile. First, a usage pattern of the electric automobile on the following day is predicted from a weekly schedule. Then, an investigation is made concerning whether travel on the following day is possible with the remaining electricity amount in the battery. If the battery requires charging, the battery is charged based on the predicted usage pattern, in a manner to decrease the number of times charging will be performed in the future while also avoiding overcharging.

JP 2013-090360 A discloses charging a battery loaded in an electric automobile. Specifically, the battery is charged with the required minimal power to be consumed at the next trip by the departure timing of the next trip, based on the remaining capacity of the battery of the electric automobile and next trip information concerning the next usage of the electric automobile.

SUMMARY OF THE INVENTION

In JP 2012-228165 A, the charge amount for the battery is set such that the next scheduled charging day will be pushed back. However, if the one-day power consumption amount is low, the SOC of the battery is kept in the high SOC region for several days. From the viewpoint of suppressing deterioration of the battery, there is room for improvement in the battery charging control.

In JP 2013-090360 A, the charging amount of the battery is set according to the next trip. Therefore, it is necessary to charge the battery every time the electric automobile is used. This causes the charging work performed to become a bother for the user of the electric automobile in which the battery is loaded.

Neither of the publications described above investigates controlling the charging of the battery in consideration of both the deterioration of the battery and the bother of the charging work.

In light of this, there is a desire to eliminate the bother of the battery charging work while suppressing the battery deterioration.

The present invention has the object of realizing the above desire.

A first aspect of the present invention is a charging control apparatus that controls charging from an external power source to a battery, comprising: a chargeable amount acquiring section that, when a moving body possessing the battery is driven by power supplied from the battery, acquires a chargeable amount that is an amount the battery can be charged within a time period from a charging startable timing of the battery to a scheduled drive timing of the moving body; a minimum state of charge (SOC) calculating section that calculates a minimum SOC that is the lowest SOC needed by the moving body for the following instance of driving, based on a drive history of the moving body; and a target setting section that sets a target charging amount that suppresses deterioration of the battery and is greater than or equal to the minimum SOC, or a target charging amount that suppresses deterioration of the battery and is less than or equal to the chargeable amount.

A second aspect of the present invention is a moving body comprising the charging control apparatus described above and a battery.

A third aspect of the present invention is a charging control system comprising the charging control apparatus as described above and a battery.

A fourth aspect of the present invention is a charging control method for controlling charging of a battery from an external power source, comprising: a step of, when a moving body possessing the battery is driven by power supplied from the battery, acquiring, with a chargeable amount acquiring section, a chargeable amount that is an amount the battery can be charged within a time period from a charging startable timing of the battery to a scheduled drive timing of the moving body; a step of calculating, with a minimum SOC calculating section, a minimum SOC that is the lowest SOC needed by the moving body for the following instance of driving, based on a drive history of the moving body; and a step of setting, with a target setting section, a target charging amount that suppresses deterioration of the battery and is greater than or equal to the minimum SOC, or a target charging amount that suppresses deterioration of the battery and is less than or equal to the chargeable amount.

With the present invention, the battery is charged up to a target SOC that suppresses battery deterioration and is greater than or equal to the minimum SOC, with a single instance of charging. Alternatively, the battery is charged with a target charging amount that suppresses battery deterioration and is less than or equal to the chargeable amount, with a single instance of charging. Therefore, the battery is not charged beyond what is necessary. As a result, it is possible to suppress deterioration of the battery. Furthermore, there is no need to charge the battery every time the moving body is driven. Therefore, it is possible to eliminate the bother of the battery charging work.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8 is a diagram showing a relationship between the SOC and the deterioration acceleration of the battery.

DESCRIPTION OF THE INVENTION

Figure 1:
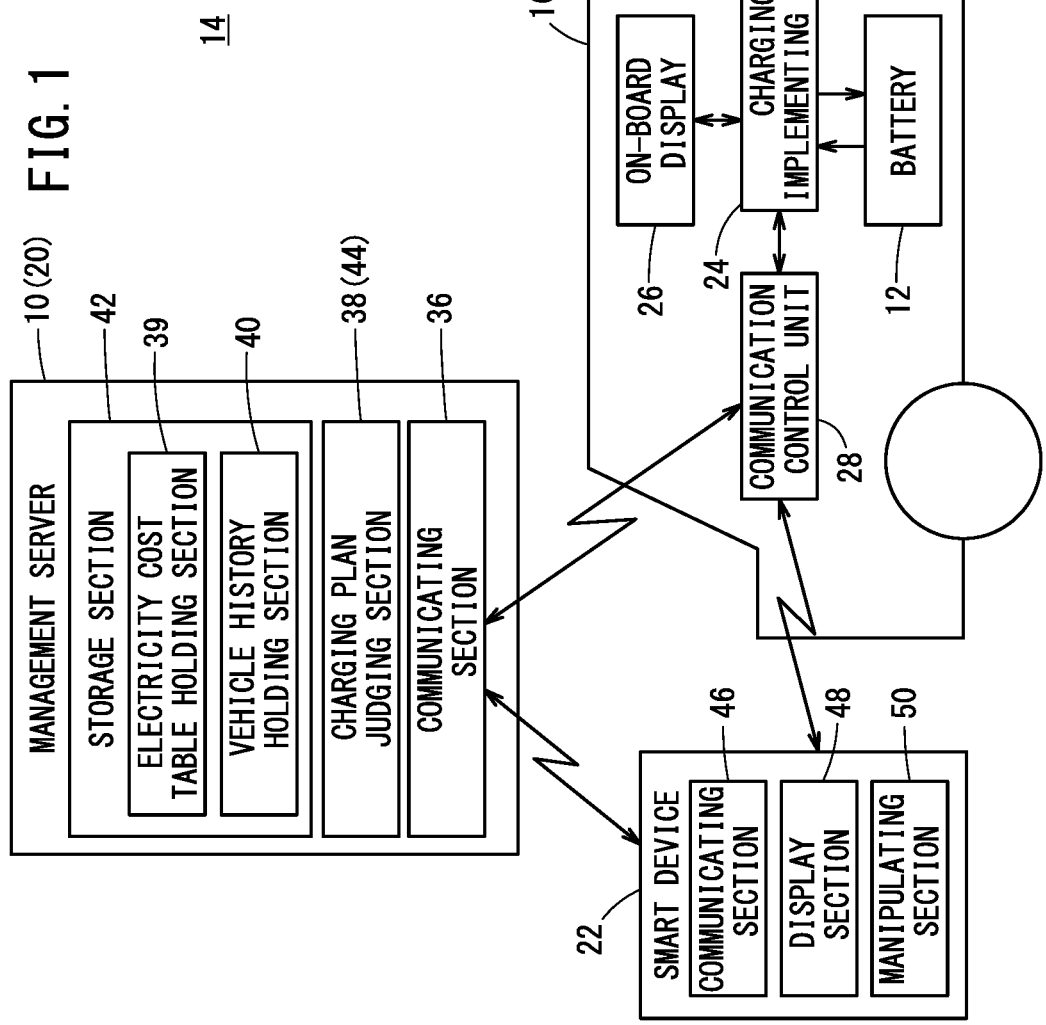
FIG. 1 is a block diagram of a charging control system that includes a charging control apparatus and a vehicle, according to an embodiment.

FIG. 1 is a block diagram of a charging control system 14 including a charging control apparatus 10 and a battery 12, according to an embodiment. The charging control system 14 includes a vehicle 16, charging equipment 18, a management server 20, and a smart device 22. The vehicle 16 is a moving body on which the battery 12 is loaded. The charging equipment 18 is a power source outside the vehicle 16. The smart device 22 is an information communication device that is used by a user. The user is a user of the battery 12. The user is also a user of the vehicle 16. The charging control apparatus 10 controls charging of the battery 12 in the vehicle 16 from the charging equipment 18. In the description below, a case is described in which the management server 20 is the charging control apparatus 10.

In the present embodiment, the moving body is an object capable of moving (being driven) by the supply of power from the battery 12. The present embodiment is applicable to various types of moving bodies including various vehicles such as two-wheel, three-wheel, and four-wheel vehicles, flying bodies such as airplanes, boats, and the like. The present invention is not limited to a moving body, and is also applicable to charging control of a battery 12 in various types of devices that are driven by the supply of power from the battery 12.

In the present embodiment, a case is described in which the battery 12 is charged from the charging equipment 18 that is a plug-in type, as shown in FIG. 1. In the present embodiment, the charging equipment 18 is capable of charging the battery 12 using a non-contact power supply method.

In a case where the moving body is a vehicle 16, an electric vehicle that travels using power supplied from the battery 12 is included in the scope of this vehicle 16. Furthermore, the vehicle 16 may be a hybrid vehicle. A hybrid vehicle includes a motor and an internal combustion engine. The motor receives the power supplied from the battery 12 to provide drive.

In the present embodiment, an ECU (not shown in the drawings) inside the vehicle 16 may be the charging control apparatus 10. Alternatively, the smart device 22 may be the charging control apparatus 10.

The vehicle 16 includes the battery 12, a charging implementing section 24, an on-board display 26, a communication control unit 28, and a charging port 30. The charging equipment 18 is installed on the premises of the home of the user who uses the vehicle 16, for example. A cable 32 extends from the charging equipment 18. The tip of the cable 32 is provided with a charging connector 34 (charging gun). When the vehicle 16 is on the premises, the user inserts the charging connector 34 into the charging port 30. When the charging connector 34 is inserted into the charging port 30, the charging equipment 18 can charge the battery 12. When the charging connector 34 is connected to the charging port 30, the charging implementing section 24 causes the charging equipment 18 to perform charging of the battery 12, in accordance with control from the management server 20. The charging implementing section 24 can acquire various types of information concerning the vehicle 16, using various sensors. The various types of information concerning the vehicle 16 include information concerning the battery 12. Such information includes the SOC (remaining capacity) of the battery 12, the temperature of the battery 12, and the temperature outside the vehicle 16. In the following description, the temperature of the battery 12 is referred to as the battery temperature.

The on-board display 26 is a navigation apparatus or the like provided to the vehicle 16. The on-board display 26 displays various types of information as images. The on-board display 26 is capable of outputting the various types of information as sound. The on-board display 26 includes a manipulating section. The manipulating section is a touch panel or the like that receives manipulation input from the user.

The communication control unit 28 is capable of transmitting and receiving information through wireless communication, between the management server 20 and the smart device 22. As an example, the communication control unit 28 receives instruction content concerning the charging control of the battery 12 from the management server 20, and outputs this instruction content to the charging implementing section 24. The communication control unit 28 transmits various types of information concerning the battery 12 acquired by the charging implementing section 24 to the management server 20.

The management server 20 includes a communicating section 36, a control section 38 (chargeable amount acquiring section, necessary charging amount estimating section, target setting section, electricity cost acquiring section, charging frequency acquiring section, and deterioration acceleration acquiring section), and a storage section 42. The storage section 42 includes an electricity cost table holding section 39 and a vehicle history holding section 40. The control section 38 is a CPU of the management server 20. By reading and executing a program stored in the storage section 42, the control section 38 functions as a charging plan judging section 44. The charging plan judging section 44 performs a charging schedule setting and the like. The charging schedule is a schedule for causing the charging equipment 18 to charge the battery 12. The detailed function of the charging plan judging section 44 is described further below.

The communicating section 36 is capable of transmitting and receiving information through wireless communication to and from the communication control unit 28 of the vehicle 16. The communicating section 36 is capable of transmitting and receiving information through wireless communication to and from the smart device 22. The communicating section 36 receives various types of information concerning the vehicle 16, for example. This information includes the SOC, battery temperature, and outside temperature described above.

The communicating section 36 is capable of receiving information about electricity cost per unit of power of the charging equipment 18, from a power company that the user has formed a contract with. Alternatively, the communicating section 36 is capable of receiving information about electricity cost per unit of power of the charging equipment 18 from a power aggregator acting as an intermediary between the user and the power company. Specifically, the information about the electricity cost is a cost plan of the charging equipment 18. The received cost plan of the charging equipment 18 is stored in the electricity cost table holding section 39. Accordingly, an electricity cost table based on the contract of the user is stored in the electricity cost table holding section 39. Alternatively, in the case of a variable tariff rate contract in which the electricity cost varies in prescribed units according to a supply and demand balance for power every day, the electricity cost table of the electricity cost table holding section 39 is updated automatically by having the communicating section 36 communicate periodically with the power company or the power aggregator.

The smart device 22 includes a communicating section 46, a display section 48, and a manipulating section 50. The communicating section 46 is capable of transmitting and receiving information through wireless communication to and from the communicating section 36 of the management server 20. The communicating section 46 is capable of transmitting and receiving information through wireless communication to and from the communication control unit 28 of the vehicle 16. The display section 48 displays various types of information as images. The manipulating section 50 is a touch panel or the like that receives manipulation input from the user.

The following describes the charging control according to the present embodiment, while referencing FIGS. 2 to 8. In the charging control of the present embodiment, after the user has driven the vehicle 16 (see FIG. 1) and returned home, the charging equipment 18 charges the battery 12. The charging of the battery 12 is performed in a time period from when the user arrives at home to when the user drives the vehicle 16 to depart from home. The charging of the battery 12 is performed in a time period from the day on which the user arrived at home to the following day, for example. Accordingly, the user drives the vehicle 16 to depart from home after the charging has ended. After this, the user drives the vehicle 16 to return home.

FIGS. 2 to 7 are flow charts showing a setting process of a charging schedule and a charging process of the battery 12 based on the set charging schedule. In the charging schedule setting process, a process of setting an SOC target value (target SOC) is included before the charging of the battery 12. The process shown in FIGS. 2 to 7 is mainly performed by the charging plan judging section 44.

First, after the vehicle 16 (FIG. 1) driven by the user has returned to the home, the user inserts the charging connector 34 of the charging equipment 18 into the charging port 30. Due to this, the charging connector 34 and the charging port 30 are connected. The charging implementing section 24 notifies the charging plan judging section 44 that a state in which the battery 12 can be charged from the charging equipment 18 has been realized, via the communication control unit 28 and the communicating section 36.

Figure 2:
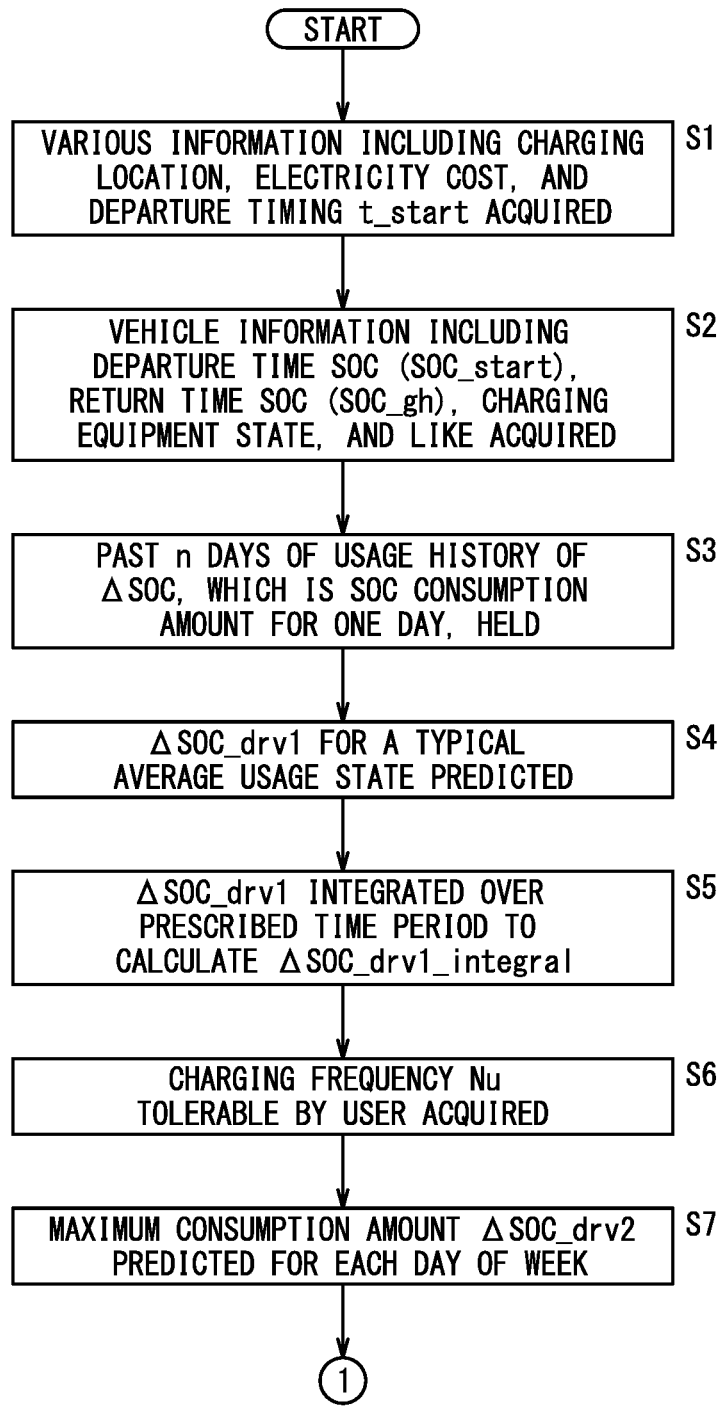
FIG. 2 is a flow chart of the charging control.

At step S1 of FIG. 2, the charging plan judging section 44 (see FIG. 1) receives this notification and acquires various types of information. These various types of information include a charging location, electricity costs categorized by time periods (cost plan) corresponding to a charging location or electricity company, and a scheduled departure timing t_start of the vehicle 16, for example.

In the present embodiment, charging of the battery 12 is performed from the charging equipment 18 on the premises of the home. Therefore, at step S1, the charging plan judging section 44 first acquires information concerning the charging location where the battery 12 is to be charged. In other words, the charging plan judging section 44 acquires information concerning the charging equipment 18. In the following description, the information concerning the charging equipment 18 is referred to as the charging equipment information. Specifically, if the charging equipment information initially set by the user is stored in the electricity cost table holding section 39, the charging plan judging section 44 references this stored charging equipment information. If it has been determined in advance that the battery 12 is to be charged on the premises of the home, the charging plan judging section 44 may omit the process of acquiring the charging equipment information.

Furthermore, the charging plan judging section 44 acquires the cost plan stored in advance in the electricity cost table holding section 39. Alternatively, the charging plan judging section 44 acquires the cost plan via the communicating section 36 from an electricity company or electricity aggregator with whom the user has made a contract. In a case where the cost plan is acquired from an electricity company, the acquired cost plan is stored in the electricity cost table holding section 39.

Furthermore, at step S1, the charging plan judging section 44 issues a request for transmission of the scheduled departure timing t_start to the communication control unit 28 of the vehicle 16, via the communicating section 36. The on-board display 26 provides a display or the like prompting the input of the scheduled departure timing t_start, based on the transmission request received by the communication control unit 28. After checking the display content of the on-board display 26, the user manipulates the on-board display 26 to input the scheduled departure timing t_start. Due to this, the charging plan judging section 44 can acquire the scheduled departure timing t_start input by the user, via the communication control unit 28 and the communicating section 36.

Alternatively, the charging plan judging section 44 may issue the request for transmission of the scheduled departure timing t_start to the communicating section 46 of the smart device 22, via the communicating section 36. The display section 48 of the smart device 22 provides a display prompting the input of the scheduled departure timing t_start, based on the transmission request received by the communicating section 46. After checking the display content of the display section 48, the user manipulates the manipulating section 50 to input the scheduled departure timing t_start. Due to this, the charging plan judging section 44 can acquire the scheduled departure timing t_start input by the user, via each of the communicating sections 36 and 46.

The charging implementing section 24 acquires various types of information concerning the vehicle 16 (battery 12), using sensors (not shown in the drawings). Examples of the various types of information include the SOC of the battery 12, the battery temperature, the outside temperature around the vehicle 16, and the state of the charging equipment 18 (the connection state between the vehicle 16 and the charging equipment 18, for example). At the following step S2, the charging plan judging section 44 acquires the various types of information concerning the vehicle 16 from the charging implementing section 24, via the communication control unit 28 and the communicating section 36.

Specifically, at step S2, the charging plan judging section 44 acquires today's information indicating the SOC at the departure time of the vehicle 16 (departure time SOC, SOC_start), the SOC at the return time (return time SOC, SOC_gh), and the state of the charging equipment 18.

At the following step S3, the charging plan judging section 44 calculates a consumption amount ΔSOC of the SOC, using the acquired departure time SOC and return time SOC. The consumption amount ΔSOC is a one-day consumption amount of the SOC on the current day. The charging plan judging section 44 calculates the consumption amount ΔSOC using a formula such as ΔSOC=(SOC_start)−(SOC_gh), for example. The charging plan judging section 44 stores the calculated consumption amount ΔSOC in the vehicle history holding section 40 as usage history of the battery 12 (travel history of the vehicle 16).

Accordingly, the consumption amount ΔSOC calculated in step S3 is the consumption amount that is consumed by one day of travel with the vehicle 16. In this way, the consumption amount ΔSOC for each day is stored in the vehicle history holding section 40. The consumption amount ΔSOC of each of the past n days (n is an integer greater than or equal to 1) is held in the vehicle history holding section 40 as the usage history.

Alternatively, the SOC of the battery 12 decreases due to travel with the vehicle 16, use of air conditioning, or the like. In the case of such usage of the vehicle 16, the charging plan judging section 44 calculates the one-day consumption amount ΔSOC in the manner described below. Essentially, every time the vehicle 16 is activated, the charging plan judging section 44 calculates a difference between the SOC of the battery 12 at the usage start time of the vehicle 16 and the SOC at the usage end time of the vehicle 16, as the one-time consumption amount. Next, the charging plan judging section 44 calculates the one-day consumption amount ΔSOC by integrating the calculated one-time consumption amount ΔSOC over one day. Specifically, the charging plan judging section 44 calculates the one-day consumption amount ΔSOC by multiplying the one-time consumption amount by the number of activations (number of usages) of the vehicle 16 in one day.

In the following description, the units for "consumption amount" are [Wh], which are units of an electrical power amount. Instead, the units for "consumption amount" may be [Ah] (ampere hours).

At the following step S4, the charging plan judging section 44 predicts the consumption amount ΔSOC_drv1 (average consumption amount) separately for each day of the week. Specifically, the consumption amounts ΔSOC of the past n days (usage history of the battery 12 for each day) are stored in the vehicle history holding section 40. The charging plan judging section 44 predicts the consumption amount ΔSOC_drv1 using a statistical estimation computation, based on the transition of the consumption amount ΔSOC over the past n days.

The consumption amount ΔSOC_drv1 is the electrical power consumption amount, categorized for each day of the week, consumed by the typical average usage state of the vehicle 16. Furthermore, the consumption amount ΔSOC_drv1 for each day of the week is calculated from a statistical value (mean, mode, median, third quartile, or the like) of the consumption amounts ΔSOC of the past n days. The consumption amount ΔSOC_drv1 for each day of the week corresponds to a one-day charging amount needed for the vehicle 16 to travel within a typical range. Accordingly, the consumption amount ΔSOC_drv1 is not limited to the average value of the consumption amount ΔSOC for each day of the week. The consumption amount ΔSOC_drv1 for each day of the week may be any value that can be predicted from a statistical value of the consumption amount ΔSOC for each day of the week in a typical usage state of the vehicle 16. Examples of the statistical value of the consumption amount ΔSOC include the mean, mode, median, and third quartile.

At the following step S5, the charging plan judging section 44 integrates the predicted values of the daily average consumption amounts over a prescribed interval starting on the following day, based on the consumption amount ΔSOC_drv1 for each day of the week. In this way, the charging plan judging section 44 calculates an average consumption amount ΔSOC_drv1_integral of the prescribed interval starting on the following day. In the present embodiment, the prescribed interval starting from the following day is one week, for example. Furthermore, the average consumption amount ΔSOC_drv1_integral is the average consumption amount for a one-week period starting on the following day.

At the following step S6, the charging plan judging section 44 acquires a user-tolerated charging frequency Nu, which is the number of charges per week (charging frequency) that can be tolerated by the user.

Specifically, at step S6, the charging plan judging section 44 issues a request for transmission of the user-tolerated charging frequency Nu to the communication control unit 28 of the vehicle 16, via the communicating section 36. The on-board display 26 provides a display or the like prompting input of the user-tolerated charging frequency Nu, based on the transmission request received by the communication control unit 28. After checking the display content of the on-board display 26, the user manipulates the on-board display 26 to input the user-tolerated charging frequency Nu. Due to this, the charging plan judging section 44 can acquire the user-tolerated charging frequency Nu input by the user, via the communication control unit 28 and the communicating section 36.

Alternatively, the charging plan judging section 44 may issue the request for transmission of the user-tolerated charging frequency Nu to the communicating section 46 of the smart device 22. The display section 48 of the smart device 22 provides a display prompting input of the user-tolerated charging frequency Nu, based on the transmission request received by the communicating section 46. After checking the display content of the display section 48, the user manipulates the manipulating section 50 to input the user-tolerated charging frequency Nu. Due to this, the charging plan judging section 44 can acquire the user-tolerated charging frequency Nu input by the user, via each of the communicating sections 36 and 46.

When setting the user-tolerated charging frequency Nu, the on-board display 26 or the display section 48 of the smart device 22 may provide a bar display or the like indicating the number of times that charging can be performed within one week, for example. That is, the on-board display 26 or the display section 48 of the smart device 22 provides a bar display spanning between an upper limit value and a lower limit value of the SOC to which the battery 12 can be charged. Due to this, the user can intuitively understand the number of times charging can be performed in one week. Furthermore, the user can easily set the user-tolerated charging frequency Nu.

Alternatively, the charging plan judging section 44 acquires a statistical value of the number of charges per week (charging frequency), which is the charging frequency during a prescribed interval in the past, from the vehicle history holding section 40. Due to this, the charging plan judging section 44 can set the past charging frequency, which the user themselves has judged to be necessary, as the user-tolerated charging frequency Nu. Examples of the statistical value of the number of charges per week include the mean, mode, median, and third quartile.

In the following description, concerning the various types of charging frequency including the user-tolerated charging frequency Nu, the charging amount of a single charging becomes greater as the number of charges becomes smaller. On the other hand, the charging amount of a single charging becomes smaller as the number of charges becomes greater.

At the following step S7, the charging plan judging section 44 predicts a maximum consumption amount ΔSOC_drv2 categorized for each day of the week. Specifically, the past consumption amounts ΔSOC are stored in the vehicle history holding section 40. The charging plan judging section 44 predicts the maximum consumption amount ΔSOC_drv2 for each day of the week using a statistical estimation computation, based on the transition of the consumption amounts ΔSOC in the past.

The past consumption amounts ΔSOC are the usage history of the battery 12 for each day. Furthermore, the maximum consumption amount ΔSOC_drv2 for each day of the week is calculated from a statistical value of the past consumption amount ΔSOC. The maximum consumption amount ΔSOC_drv2 for each day of the week corresponds to a one-day charging amount needed in a case where the SOC of the battery 12 that is consumed is greater than usual. Examples of the statistical value of the past consumption amount ΔSOC include a maximum value or a high whisker value from which outliers have been removed.

The maximum consumption amount ΔSOC_drv2 for each day of the week reflects the travel history of the past consumption amount ΔSOC in so-called irregular situations where more energy than usual was consumed. Examples of such irregular situations include a case where the vehicle 16 travels farther than usual, a case where the vehicle 16 encounters irregular traffic conditions (traffic congestion caused by an accident) that differ from the usual, and a case where the outside temperature suddenly drops, such as during the change of seasons. Accordingly, the maximum consumption amount ΔSOC_drv2 may be any value that can be predicted from a statistical value of the consumption amount ΔSOC for each day of the week with an irregular usage state of the vehicle 16.

Figure 3:
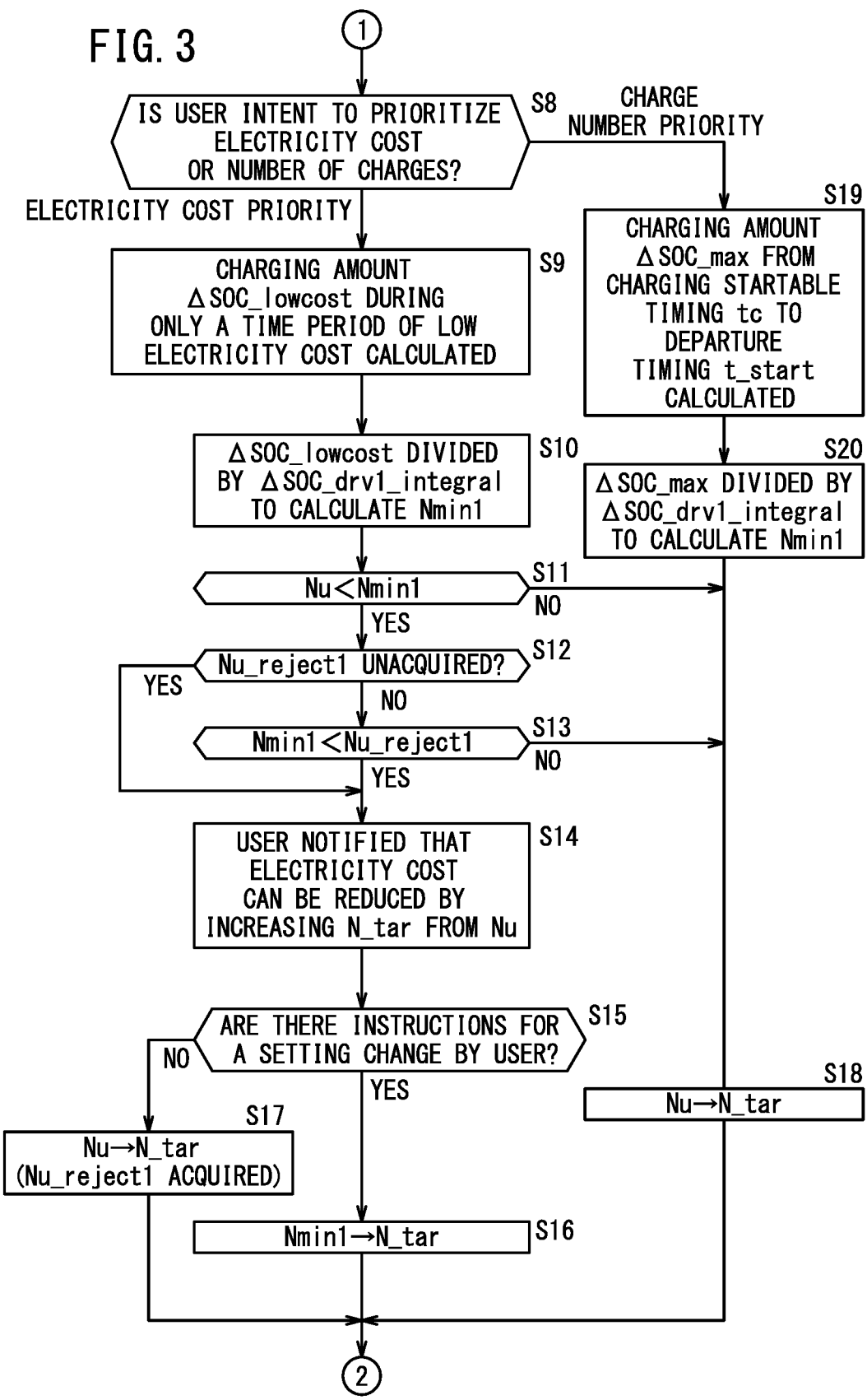
FIG. 3 is a flow chart of the charging control.

At step S8 of FIG. 3, the charging plan judging section 44 (see FIG. 1) causes the user to select their intent concerning charging of the battery 12. Specifically, the charging plan judging section 44 causes the user to select whether to prioritize the electricity cost or to prioritize the number of charges, when charging the battery 12. A case where the electricity cost is to be prioritized is a case where the user wants to perform charging in a manner to restrict the electricity cost by increasing the number of times charging is performed. A case where the number of charges is to be prioritized is a case where the user wants to perform charging in a manner to reduce the number of times charging is performed without considering the electricity cost.

At step S8 as well, the charging plan judging section 44 issues a request for transmission of the intent of the user to the vehicle 16 or the smart device 22, via the communicating section 36, in the same manner as in step S6 of FIG. 2. Due to this, the user can manipulate the on-board display 26 or the smart device 22 to input their intent concerning electricity cost priority or charge number priority. As a result, the charging plan judging section 44 acquires the intent of the user input by the user, via the communicating section 36, and performs the judging process of step S8 in accordance with the acquired user intent.

Alternatively, the intent of the user used in the judging process of step S8 may be stored in advance in the vehicle history holding section 40. Due to this, the charging plan judging section 44 performs the judging process of step S8 by referencing the user intent stored in the vehicle history holding section 40.

If the user selects the electricity cost priority in step S8, the charging plan judging section 44 proceeds to step S9. At step S9, the charging plan judging section 44 calculates a charging amount ΔSOC_lowcost (low-cost charging amount) in consideration of the information concerning the charging equipment 18, the electricity cost, the scheduled departure timing t_start, the current value of the SOC, the battery temperature, and the like. The charging amount ΔSOC_lowcost is a charge amount that is the maximum chargeable amount for the battery 12 with a cost that is a lowest cost and also less than a prescribed cost. In this case, the electricity cost needed for the calculation of the charging amount ΔSOC_lowcost may be selected by the user, in the same manner as in step S8. Furthermore, in the following description, the current value of the SOC is referred to as the current SOC.

At the following step S10, the charging plan judging section 44 divides the charging amount ΔSOC_lowcost by the average consumption amount ΔSOC_drv1_integral of a one-week period starting on the following day. In this way, the charging plan judging section 44 calculates a minimum value Nmin1 of the charging frequency of the battery 12 per week. In the following description, the minimum value Nmin1 of the charging frequency is referred to as the minimum charging frequency Nmin1.

At the following step S11, the charging plan judging section 44 judges whether the user-tolerated charging frequency Nu is less than the minimum charging frequency Nmin1. The user-tolerated charging frequency Nu is a fixed value set by the user. If the user-tolerated charging frequency Nu is less than the minimum charging frequency Nmin1 that takes the electricity cost into consideration (Nu<Nmin1), it is possible to reduce the electricity cost if a target value N_tar of the charging frequency to be used in the charging control is increased from the user-tolerated charging frequency Nu to the minimum charging frequency Nmin1. In the following description, the target value N_tar of the charging frequency is also referred to as the target charging frequency N_tar.

If Nu<Nmin1 (step S11: YES), the charging plan judging section 44 proceeds to step S12. At step S12, the charging plan judging section 44 judges whether a user-tolerated charging frequency Nu_reject1 is unacquired. The user-tolerated charging frequency Nu_reject1 is a threshold value of the charging frequency at which the user does not tolerate the number of charges, even if the electricity cost can be reduced. The charging plan judging section 44 may acquire the user-tolerated charging frequency Nu_reject1 from the user, using the same procedure as in step S6.

Here, a case where the user-tolerated charging frequency Nu_reject1 is not unacquired is a case where the charging plan judging section 44 has acquired the user-tolerated charging frequency Nu_reject1. In this case (step S12: NO), the charging plan judging section 44 proceeds to step S13. At step S13, the charging plan judging section 44 judges whether the minimum charging frequency Nmin1 is less than the user-tolerated charging frequency Nu_reject1.

If Nmin1<Nu_reject1 (step S13: YES), or if the user-tolerated charging frequency Nu_reject1 is judged to be unacquired at step S12 (step S12: YES), the charging plan judging section 44 proceeds to step S14. In other words, this is because the charging plan judging section 44 can determine that providing the user with notification that the number of charges can be increased will not cause a problem.

At step S14, the charging plan judging section 44 transmits notification that the electricity cost can be reduced by increasing the target charging frequency N_tar from Nu, via the communicating section 36, to the vehicle 16 or smart device 22.

Due to this, the user checks the notification in the on-board display 26 or the display section 48 of the smart device 22. Next, the user issues a response indicating whether a change of the target charging frequency N_tar is necessary, by manipulating the on-board display 26 or the manipulating section 50 of the smart device 22. As a result, the charging plan judging section 44 can acquire the response input by the user, via the communicating section 36.

At the following step S15, the charging plan judging section 44 checks whether the acquired response is a request for increasing the target charging frequency N_tar from the user-tolerated charging frequency Nu. If the response includes a change request (step S15: YES), the charging plan judging section 44 proceeds to step S16. At step S16, the charging plan judging section 44 sets the minimum charging frequency Nmin1 to be the target charging frequency N_tar.

Furthermore, at step S15, if the response indicates that a change of the target charging frequency N_tar is not permitted (step S15: NO), the charging plan judging section 44 proceeds to step S17. At step S17, the charging plan judging section 44 sets the user-tolerated charging frequency Nu to be the target charging frequency N_tar. That is, the charging plan judging section 44 can acquire (set) the user-tolerated charging frequency Nu as the user-tolerated charging frequency Nu_reject1, as a result of the response from the user not permitting the increase.

If Nu≥Nmin1 at step S11 (step S11: NO), or if Nmin1≥Nu_reject1 at step S13 (step S13: NO), the charging plan judging section 44 proceeds to step S18. At step S18, the charging plan judging section 44 sets the user-tolerated charging frequency Nu to be the target charging frequency N_tar.

Therefore, when repeating the charging control process from the next time, it is possible to prevent making several unnecessary proposals for changing the charging frequency to the user.

Furthermore, if the charge number priority is selected at step S8, the charging plan judging section 44 proceeds to step S19. At step S19, the charging plan judging section 44 calculates a charging amount ΔSOC_max (maximum charging amount) in consideration of the information concerning the charging equipment 18, a charging startable timing tc, the scheduled departure timing t_start, the current SOC, the battery temperature, and the like. The charging startable timing tc is the timing at which the charging connector 34 is connected to the charging port 30, for example. Furthermore, the current SOC is the return time SOC (SOC_gh). Yet further, the charging amount ΔSOC_max is the maximum chargeable amount during a charging time Tc, which is from the charging startable timing tc to the scheduled departure timing t_start.

At the following step S20, the charging plan judging section 44 divides the charging amount ΔSOC_max by the average consumption amount ΔSOC_drv1_integral of the one-week period starting on the following day. In this way, the charging plan judging section 44 calculates the minimum charging frequency Nmin1. After this, the charging plan judging section 44 proceeds to step S18, and sets the user-tolerated charging frequency Nu to be the target charging frequency N_tar.

Figure 4:
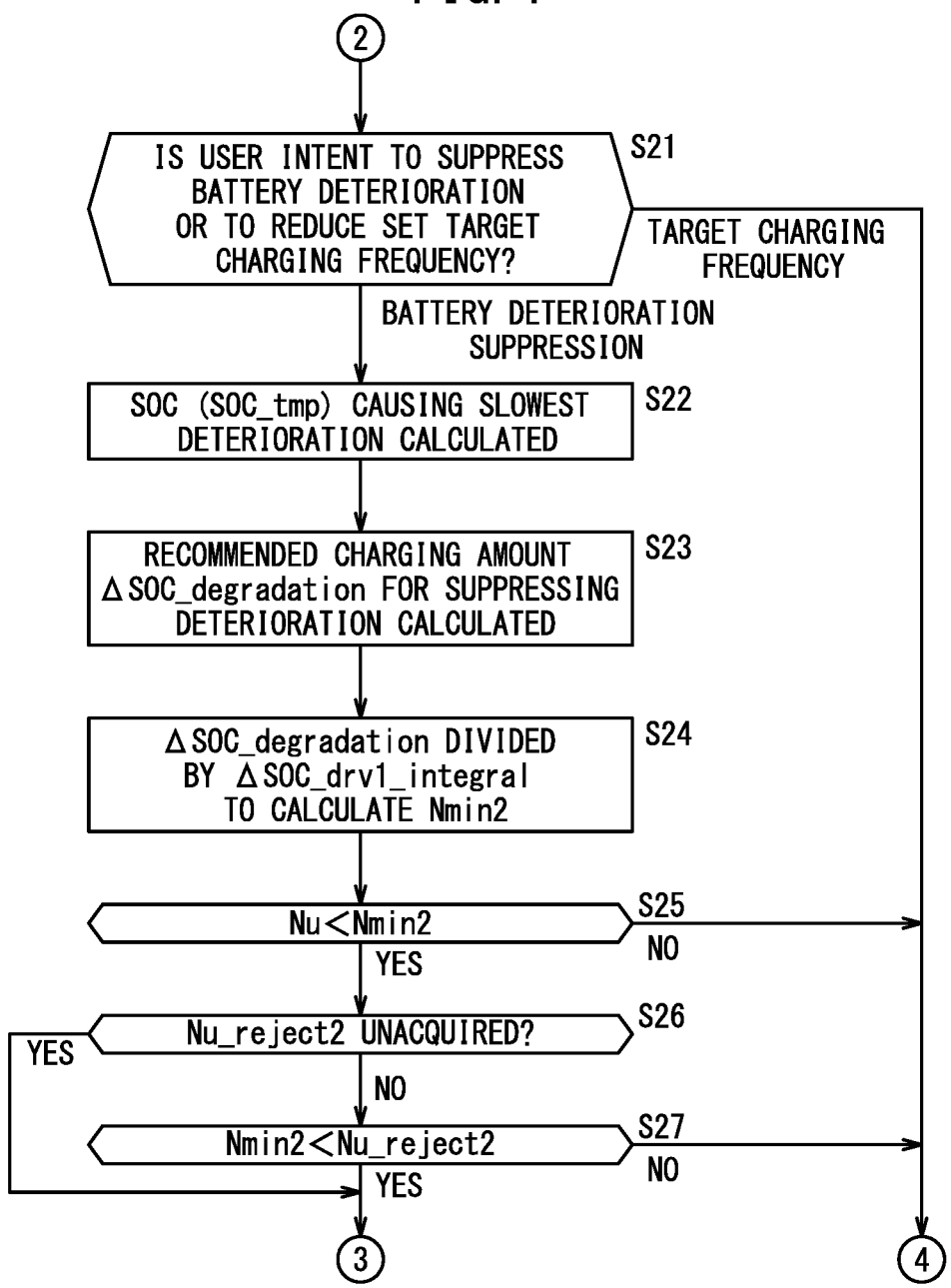
FIG. 4 is a flow chart of the charging control.

At step S21 of FIG. 4, the charging plan judging section 44 (see FIG. 1) causes the user to again select their intent concerning the charging of the battery 12, in the same manner as in step S8 of FIG. 3. Specifically, the charging plan judging section 44 causes the user to select whether to suppress deterioration of the battery 12 or to maintain the target charging frequency N_tar that was temporarily set in steps S16 to S18, when charging the battery 12. The case of suppressing the deterioration of the battery 12 is a case where the user wants to perform charging control that lowers the deterioration acceleration.

At step S21 as well, the charging plan judging section 44 issues a request for transmission of the user intent to the vehicle 16 or the smart device 22, via the communicating section 36, in the same manner as in step S8. Due to this, the charging plan judging section 44 can acquire the user intent input by the user, via the communicating section 36, and perform the judging process of step S21 in accordance with the acquired user intent.

Alternatively, the intent of the user used in the judging process of step S21 may be stored in advance in the vehicle history holding section 40. Due to this, the charging plan judging section 44 performs the judging process of step S21 by referencing the user intent stored in the vehicle history holding section 40.

If the suppression of the deterioration of the battery 12 is selected at step S21, the charging plan judging section 44 proceeds to step S22. At step S22, the charging plan judging section 44 calculates the SOC (SOC_tmp) at which the battery 12 experiences the slowest deterioration. SOC_tmp is an SOC that is greater than or equal to a set lower limit value of the target SOC determined in advance. Furthermore, SOC_tmp is the SOC at which the battery 12 experiences the slowest deterioration, when the deterioration acceleration characteristic of the battery 12 described further below (see FIG. 8) is considered.

At the following step S23, the charging plan judging section 44 subtracts the lower limit value of the SOC at the time when the battery 12 is used from SOC_tmp. In this way, the charging plan judging section 44 calculates a recommended charging amount ΔSOC_degradation for suppressing deterioration of the battery 12. In the following description, the lower limit value of the SOC is referred to as the usage lower limit SOC.

At the following step S24, the charging plan judging section 44 divides the recommended charging amount ΔSOC_degradation by the average consumption amount ΔSOC_drv1_integral for the one-week period starting on the following day. In this way, the charging plan judging section 44 calculates a minimum charging frequency Nmin2, which is the minimum value for the charging frequency of the battery 12 per week in consideration of suppressing the deterioration of the battery 12.

At the following step S25, the charging plan judging section 44 judges whether the user-tolerated charging frequency Nu is less than the minimum charging frequency Nmin2. If the user-tolerated charging frequency Nu is less than the minimum charging frequency Nmin2, which takes the deterioration of the battery 12 into consideration, (Nu<Nmin2), it is possible to suppress deterioration of the battery 12 if the target charging frequency N_tar is increased from the user-tolerated charging frequency Nu to the minimum charging frequency Nmin2.

If Nu<Nmin2 (step S25: YES), the charging plan judging section 44 proceeds to step S26. At step S26, the charging plan judging section 44 judges whether a user-tolerated charging frequency Nu_reject2 is unacquired. The user-tolerated charging frequency Nu_reject2 is a threshold value of the charging frequency at which the user does not tolerate the number of charges, even if the deterioration of the battery 12 can be suppressed. The charging plan judging section 44 may acquire the user-tolerated charging frequency Nu_reject2 from the user, using the same procedure as in step S6.

Here, a case where the user-tolerated charging frequency Nu_reject2 is not unacquired is a case where the charging plan judging section 44 has acquired the user-tolerated charging frequency Nu_reject2. In this case (step S26: NO), the charging plan judging section 44 proceeds to step S27. At step S27, the charging plan judging section 44 judges whether the minimum charging frequency Nmin2 is less than the user-tolerated charging frequency Nu_reject2.

If Nmin2<Nu_reject2 (step S27: YES), or if the user-tolerated charging frequency Nu_reject2 is judged to be unacquired at step S26 (step S26: YES), the charging plan judging section 44 proceeds to step S28. In other words, this is because the charging plan judging section 44 can determine that providing the user with notification that the number of charges can be increased will not cause a problem.

At step S28, the charging plan judging section 44 (see FIG. 1) transmits a notification that it is possible to suppress deterioration of the battery 12 by increasing the target charging frequency N_tar from Nu, via the communicating section 36, to the vehicle 16 or the smart device 22. In this case, the charging plan judging section 44 transmits the notification described above in consideration of the information concerning the charging equipment 18, the charging startable timing tc, the scheduled departure timing t_start, the current SOC, the battery temperature, the deterioration acceleration of the battery 12 described further below (see FIG. 8), and the like.

Due to this, the user checks the notification in the on-board display 26 or the display section 48 of the smart device 22. Next, the user issues a response indicating whether a change of the target charging frequency N_tar is necessary, by manipulating the on-board display 26 or the manipulating section 50 of the smart device 22. As a result, the charging plan judging section 44 can acquire the response input by the user, via the communicating section 36.

At the following step S29, the charging plan judging section 44 checks whether the acquired response is a request for increasing the target charging frequency N_tar. If the response includes an increase request (step S29: YES), the charging plan judging section 44 proceeds to step S30. At step S30, the charging plan judging section 44 updates the target charging frequency N_tar to be a higher value than the user-tolerated charging frequency Nu.

Furthermore, at step S29, if the response indicates that an increase of the target charging frequency N_tar is not permitted (step S29: NO), the charging plan judging section 44 proceeds to step S31. At step S31, the charging plan judging section 44 confirms the target charging frequency N_tar set in steps S16 to S18 of FIG. 3, without changing the target charging frequency N_tar. In other words, the charging plan judging section 44 can acquire (set) the user-tolerated charging frequency Nu as the user-tolerated charging frequency Nu_reject2, as a result of the response from the user not permitting the increase.

Figure 5:
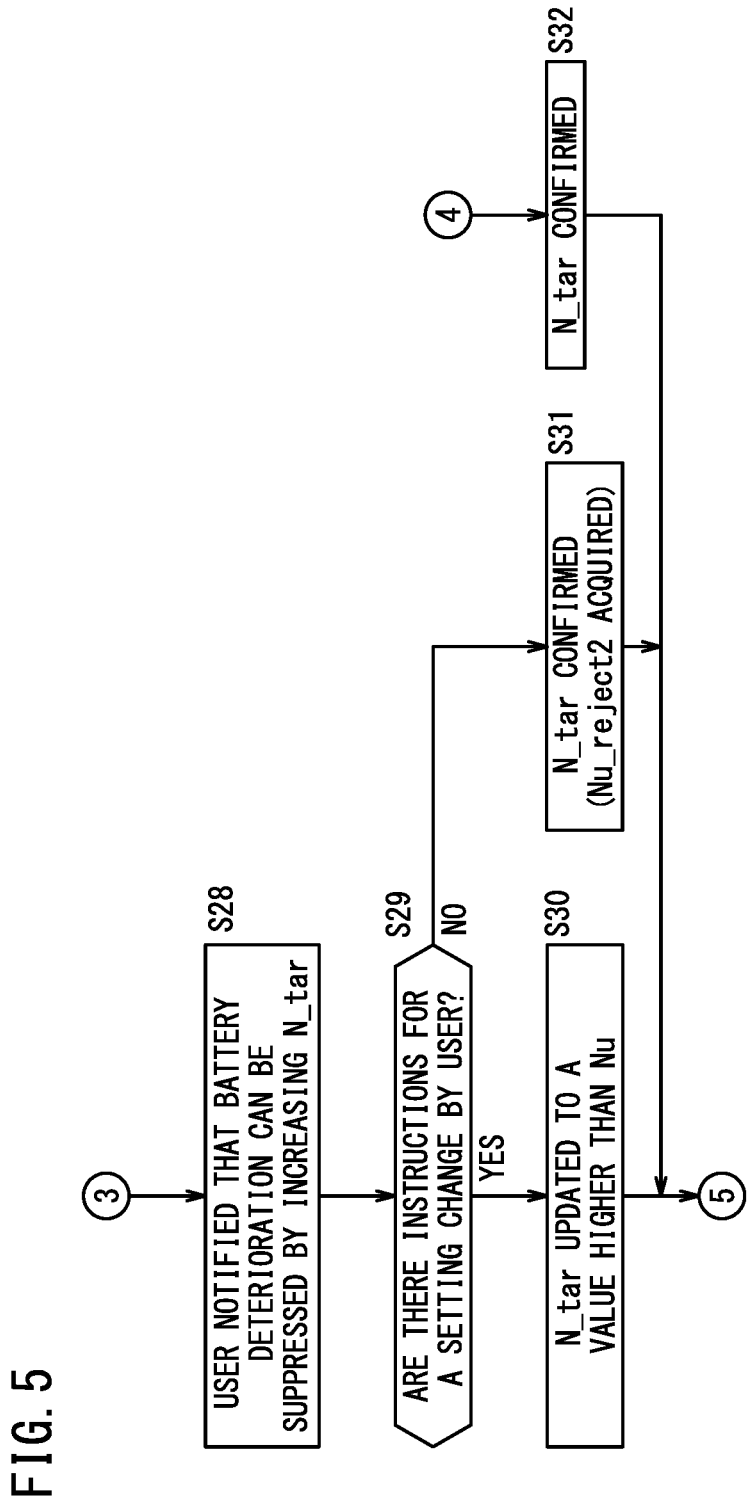
FIG. 5 is a flow chart of the charging control.

If the user selects the temporarily set target charging frequency N_tar at step S21 of FIG. 4, the charging plan judging section 44 proceeds to step S32 of FIG. 5. Alternatively, if Nu Nmin2 at step S25 (step S25: NO), the charging plan judging section 44 proceeds to step S32. Furthermore, if Nmin2 Nu_reject2 at step S27 (step S27: NO), the charging plan judging section 44 proceeds to step S32. At step S32, the charging plan judging section 44 confirms the target charging frequency N_tar set in steps S16 to S18 of FIG. 3.

Therefore, when repeating the charging control process from the next time, it is possible to prevent making several unnecessary proposals for changing the charging frequency to the user.

In FIGS. 3 to 5, a case could be envisioned where the user does not notice the notification provided by the on-board display 26 or the display section 48 of the smart device 22 of FIG. 1. If there is no response concerning whether it is necessary to increase the target charging frequency N_tar, the charging plan judging section 44 does not update the target charging frequency N_tar. Accordingly, the charging plan judging section 44 does not acquire the user-tolerated charging frequency Nu_reject1 and the user-tolerated charging frequency Nu_reject2.

Furthermore, in the above description, the notification for asking about the user intent is provided to the user in each of steps S8 and S21. Furthermore, the notification for asking about whether it is necessary to increase the target charging frequency N_tar is provided to the user in each of steps S14 and S28. In this charging control, it is possible to group together the notifications for asking about the user intent into a single notification. Furthermore, it is possible to group together the notifications for asking about whether it is necessary to increase the target charging frequency N_tar into a single notification.

Furthermore, as described above, there are cases where the user issues a response refusing the increase of the target charging frequency N_tar once, in response to the notification asking whether an increase of the target charging frequency N_tar is necessary. In this case, in order to not irritate the user, a similar recommendation (notification) is not provided from the next time.

Figure 6:
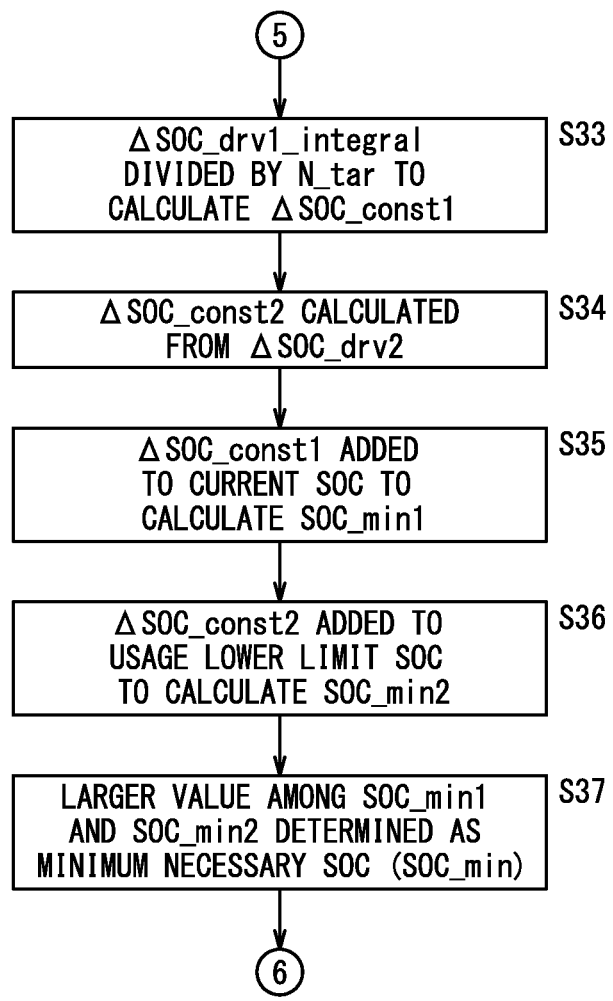
FIG. 6 is a flow chart of the charging control.

At step S33 in FIG. 6, the charging plan judging section 44 (see FIG. 1) divides the average consumption amount ΔSOC_drv1_integral of one week by the target charging frequency N_tar. In this way, the charging plan judging section 44 calculates a charging amount ΔSOC_const1. The charging amount ΔSOC_const1 is a charging amount needed for a one-time charging in a case where the consumption amount caused by the average usage of the vehicle 16 over a one-week period is to be covered by a prescribed number of charges. In the following description, the charging amount ΔSOC_const1 is referred to as the necessary charging amount ΔSOC_const1.

The necessary charging amount ΔSOC_const1 (first necessary charging amount) is a charging amount necessary for one instance of charging, in order to make the charging frequency (target charging frequency N_tar) less than or equal to the charging frequency that is tolerable by the user. In this case, this charging frequency is the user-tolerated charging frequency Nu, Nu_reject1, or Nu_reject2.

At the following step S34, the charging plan judging section 44 calculates a charging amount ΔSOC_const2, from a maximum charging amount ΔSOC_drv2, categorized by each day of the week, on the following day on which charging is to be performed. The charging amount ΔSOC_const2 is a charging amount preventing the battery 12 from having an insufficient remaining capacity, in a case where a greater amount of energy than usual is to be consumed during the travel with the vehicle 16 on the following day. Furthermore, the charging amount ΔSOC_const2 is the charging amount necessary for covering a generous amount of consumption caused by one day of travel, in a case where a greater amount of energy than usual is to be consumed during the travel with the vehicle 16 on the following day. In the following description, the charging amount ΔSOC_const2 is referred to as the necessary charging amount ΔSOC_const2.

The necessary charging amount ΔSOC_const2 (second necessary charging amount) is a charging amount necessary to cover the energy consumption amount in a case where the energy consumption is caused by an irregular usage state of the vehicle 16, as described above.

At the following step S35, the charging plan judging section 44 adds the necessary charging amount ΔSOC_const1 to the current SOC. In this way, the charging plan judging section 44 calculates SOC_min1 (first minimum SOC) (SOC_min1=current SOC+ΔSOC_const1). SOC_min1 is the lowest SOC needed to make the target charging frequency N_tar less than or equal to the charging frequency that can be tolerated by the user.

At the following step S36, the charging plan judging section 44 adds the necessary charging amount ΔSOC_const2 to the usage lower limit SOC. In this way, the charging plan judging section 44 calculates SOC_min2 (second minimum SOC) (SOC_min2=usage lower limit SOC+ΔSOC_const1). SOC_min2 is the lowest SOC needed to avoid making the user feel worried about an electricity shortage.

At the following step S37, the charging plan judging section 44 determines the lowest SOC (SOC_min) needed by the battery 12 (vehicle 16). Specifically, the charging plan judging section 44 determines SOC_min to be whichever SOC is greater among the two calculated SOCs (SOC_min1 and SOC_min2). In other words, the charging plan judging section 44 calculates the minimum SOC. In the present embodiment, one SOC from among SOC_min1 and SOC_min2 may be determined to be the minimum SOC.

Figure 7:
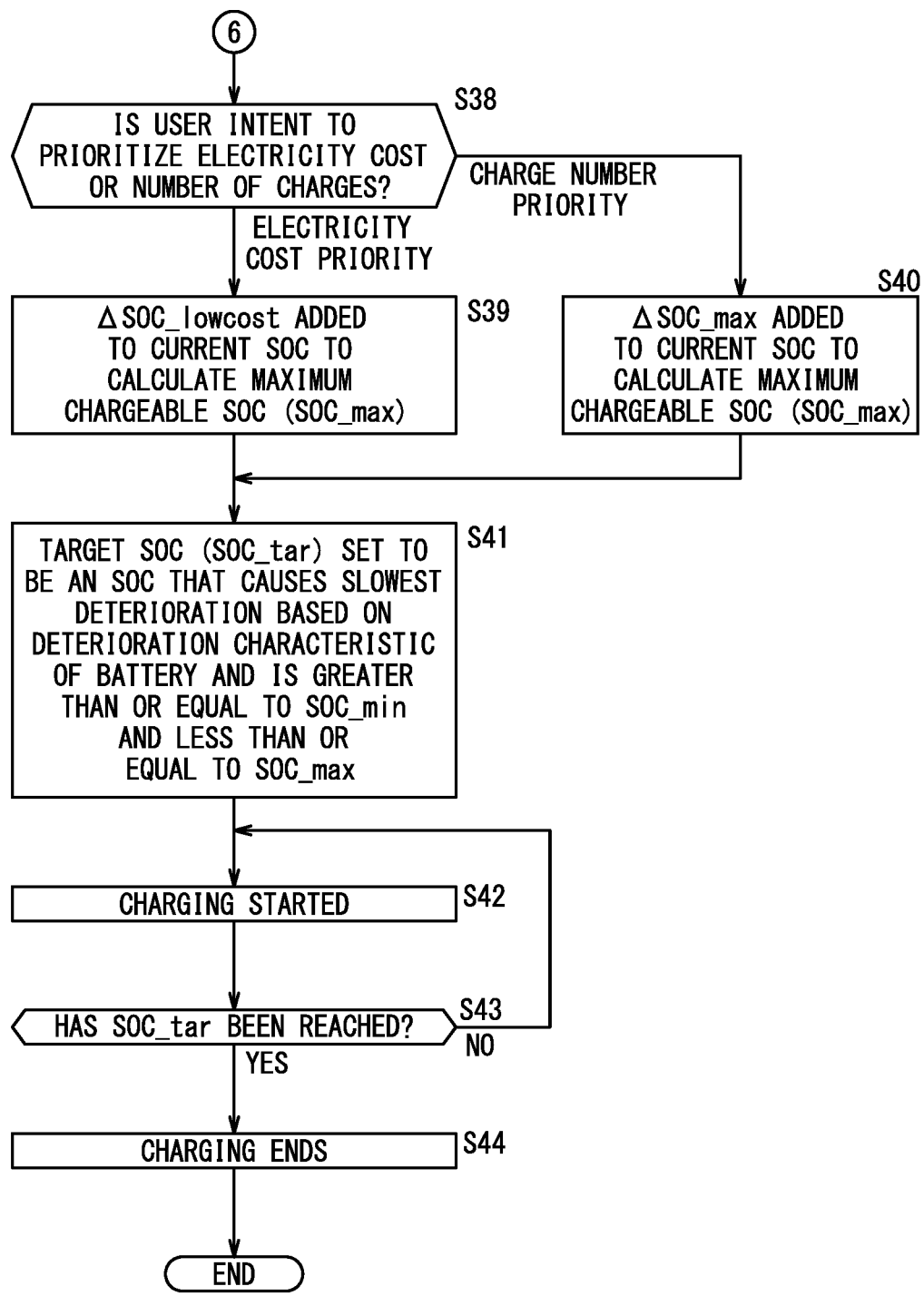
FIG. 7 is a flow chart of the charging control.

At step S38 of FIG. 7, the charging plan judging section 44 (see FIG. 1) causes the user to again select the user intent concerning the charging of the battery 12, in the same manner as in step S8 of FIG. 3. Specifically, the charging plan judging section 44 causes the user to select whether to prioritize the electricity cost or to prioritize the number of charges.

If the user selects the electricity cost priority, the charging plan judging section 44 proceeds to step S39. At step S39, the charging plan judging section 44 adds the charging amount ΔSOC_lowcost (low-cost charging amount) to the current SOC. In this way, the charging plan judging section 44 calculates the maximum chargeable SOC (SOC_max) in a case where the electricity cost is prioritized (SOC_max=current SOC+ΔSOC_lowcost). In other words, the charging plan judging section 44 calculates the maximum SOC.

If the user selects the charge number priority, the charging plan judging section 44 proceeds to step S40. At step S40, the charging plan judging section 44 adds the charging amount ΔSOC_max to the current SOC. In this way, the charging plan judging section 44 calculates the SOC (SOC_max) that is the most that can be charged in a case where the number of charges is prioritized. (SOC_max=current SOC+ΔSOC_max). In other words, the charging plan judging section 44 calculates the maximum SOC.

At the following step S41, the charging plan judging section 44 determines the SOC at which the deterioration of the battery 12 is the slowest to be the target SOC (SOC_tar), based on the deterioration acceleration characteristic (see FIG. 8) of the battery 12. The target SOC is an SOC greater than or equal to the minimum SOC (SOC_min) and less than or equal to the maximum SOC (SOC_max).

FIG. 8 shows a relationship between the SOC of the battery 12 (see FIG. 1) and the deterioration acceleration of the battery 12. As shown in FIG. 8, in a region where the SOC is less than 50%, the deterioration acceleration of the battery 12 increases in accordance with an increase of the SOC. In a region where the SOC is greater than or equal to 50% and less than 70%, the deterioration acceleration of the battery 12 decreases in accordance with an increase of the SOC. In a region where the SOC is greater than or equal to 70%, the deterioration acceleration of the battery 12 increases in accordance with an increase of the SOC.

As an example, at step S41, if the target SOC is less than 35%, the deterioration acceleration is lower than in a case where the SOC is 70%. Accordingly, the target SOC is maintained. Furthermore, at step S41, if the target SOC is greater than or equal to 35% and less than 70%, or if the target SOC is greater than or equal to 70%, the target SOC is set to be 70%, which is the SOC at which the deterioration acceleration is lowest.

In the processing of steps S33 to S41, for travel of the vehicle 16 within the scope of typical use, it is possible to cover the power consumption of the battery 12 with the average charging amount. In such a case, the target SOC is set based on SOC_min1 that takes into consideration the necessary charging amount ΔSOC_const1, or the like. Furthermore, in a case of atypical usage, the target SOC is set based on SOC_min2 that takes into consideration the necessary charging amount ΔSOC_const2, or the like. When there is atypical usage, the power consumption of the battery 12 is greater than usual. When there is atypical usage, this leads to an irregular usage state of the vehicle 16. In this way, in the present embodiment, at step S37 of FIG. 6, the minimum SOC is determined to be whichever of SOC_min1 and SOC mint is the larger value. Therefore, whether the vehicle 16 is used to travel within the typical range of the vehicle 16 or used in an irregular usage state, it is possible to ensure the necessary charge amount (necessary charging amount ΔSOC_const1 or necessary charging amount ΔSOC_const2).

Furthermore, in the processing of steps S33 to S41 in FIGS. 6 and 7, if the target SOC is set in consideration of the electricity cost, the following is performed. Essentially, if the power consumption of the battery 12 is to be covered by the average charging amount, in steps S33 to S37, the minimum SOC (SOC_min) is determined based on the necessary charging amount ΔSOC_const1 that includes the target charging frequency N_tar that takes the electricity cost into consideration, or the like. At step S39, the charging amount ΔSOC_max is calculated by adding the charging amount ΔSOC_lowcost, which is the largest chargeable amount within the time period during which the electricity cost is lowest, to the current SOC. At step S41, the target SOC is set in consideration of the minimum SOC (SOC_min) and the charging amount ΔSOC_max.

There are cases where, even though the battery 12 is charged to the greatest amount possible within the time period when the electricity cost is lowest, the charge amount necessary for covering the consumption amount of the one day of travel on the following day is not reached. In other words, there are cases where (ΔSOC_const1 or ΔSOC_const2)>ΔSOC_lowcost. In such a case, the target SOC is set such that the battery 12 is charged even during a time period in which the electricity cost is relatively high, regardless of when the time period with the lowest electricity cost is. However, if the user has selected the electricity cost priority in step S8 (see FIG. 3) and has permitted a change of the target charging frequency N_tar in step S15, a user-tolerated charging frequency Nu that results in ΔSOC_const1<ΔSOC_lowcost is set as the target charging frequency N_tar. Therefore, if the user wants to prioritize the electricity cost, the target SOC is set such that the battery 12 is charged only during the time period in which the electricity cost is lowest.

At the following step S42, the charging plan judging section 44 transmits a charging schedule that includes the set target SOC to the charging implementing section 24, via the communicating section 36 and the communication control unit 28. Due to this, the charging implementing section 24 starts charging the battery 12 based on the received charging schedule.

The charging implementing section 24 sequentially acquires the current SOC of the battery 12 even after the charging has started. At step S43, if the current SOC has reached the target SOC (step S43: YES), the charging implementing section 24 proceeds to step S44 and ends the charging of the battery 12.

In the charging control described above, a case is described in which a target SOC (SOC_tar) is set. However, in steps S33 to S41, the charging plan judging section 44 may set a charging amount for the battery 12 from the current SOC to the target SOC as a target charging amount ΔSOC_tar. In this way, it is possible to establish a charging schedule that includes the target charging amount ΔSOC_tar. The target charging amount ΔSOC_tar is greater than or equal to the necessary charging amount ΔSOC_const1 or necessary charging amount ΔSOC_const2 and less than or equal to the charging amount ΔSOC_lowcost or ΔSOC_max. Furthermore, the target charging amount ΔSOC_tar is a charging amount that suppresses the deterioration of the battery 12.

The processing of FIGS. 2 to 7 is performed on a condition that the charging connector 34 of the charging equipment 18 and the charging port 30 of the vehicle 16 have a plug-in connection. The processing of FIGS. 2 to 7 may be performed when a state in which non-contact charging from the charging equipment 18 to the battery 12 is possible.

In the processing of FIGS. 2 to 7, if the plug has fallen out of the charging equipment 18 and charging has stopped, charging may be resumed according to the original charging schedule when an activation signal (CPL signal) from the charging equipment 18 has again been detected. Furthermore, the charging schedule is not reset when the charging connector 34 is removed from the charging port 30. In this case, the charging schedule may be resumed when the charging connector 34 and charging port 30 are reconnected.

Furthermore, if the necessary charging amount ΔSOC_const2 is greater than or equal to the charging amount ΔSOC_lowcost at step S41 of FIG. 7, the charging plan judging section 44 may set the target charging amount ΔSOC_tar in a manner to suppress deterioration of the battery 12 and to be greater than or equal to ΔSOC_lowcost and less than or equal to ΔSOC_const2. Alternatively, if the necessary charging amount ΔSOC_const2 is less than the charging amount ΔSOC_lowcost, the charging plan judging section 44 may set the target charging amount ΔSOC_tar in a manner to suppress deterioration of the battery 12 and to be greater than or equal to ΔSOC_const1 or ΔSOC_const2 and less than or equal to ΔSOC_lowcost.

The present invention is not limited to the embodiment described above, and it goes without saying that various configurations can be adopted without deviating from the scope of the invention.

The following is the concept of the invention that can be understood from the embodiment described above.

A first aspect of the present invention is a charging control apparatus (10) that controls charging from an external power source (18) to a battery (12), comprising: a chargeable amount acquiring section (44) that, when a moving body (16) possessing the battery is driven by power supplied from the battery, acquires a chargeable amount (ΔSOC_lowcost, ΔSOC_max) that is an amount the battery can be charged within a time period (Tc) from a charging startable timing (tc) of the battery to a scheduled drive timing (t_start) of the moving body; a minimum SOC calculating section (44) that calculates a minimum SOC (SOC_min) that is the lowest SOC needed by the moving body for the following instance of driving, based on a drive history of the moving body; and a target setting section (44) that sets a target charging amount (ΔSOC_tar) that suppresses deterioration of the battery and is greater than or equal to the minimum SOC, or a target charging amount (ΔSOC_tar) that suppresses deterioration of the battery and is less than or equal to the chargeable amount.

With the present invention, the battery is charged up to a target SOC that suppresses battery deterioration and is greater than or equal to the minimum SOC, with a single instance of charging. Alternatively, the battery is charged with a target charging amount that suppresses battery deterioration and is less than or equal to the chargeable amount, with a single instance of charging. Therefore, the battery is not charged beyond what is necessary. As a result, it is possible to suppress deterioration of the battery. Furthermore, there is no need to charge the battery every time the moving body is driven. Therefore, it is possible to eliminate the bother of the battery charging work.

Furthermore, with the present invention, it is possible to reliably charge the battery with the charging amount needed to cover a consumption amount that is greater than the amount used for the one day of driving on the following day. Therefore, it is possible to prevent the battery from having an insufficient remaining amount during driving on the following day.

The first aspect of the present invention further comprises an electricity cost acquiring section (44) that acquires an electricity cost of the external power source; and the target setting section sets the target SOC or the target charging amount such that the battery is charged in a time period during which the electricity cost is relatively low.

In this way, with the present invention, the battery is charged in consideration of the charging cost as well. Therefore, it is possible to prevent the battery from having an insufficient remaining amount during driving on the following day. Furthermore, it is possible to reduce the electricity cost while suppressing the battery deterioration.

In the first aspect of the present invention, the charging control apparatus further comprises a charging frequency acquiring section (44) that acquires a tolerable charging frequency (Nu) of the battery that can be tolerated by a user of the moving body; and the target setting section sets the target SOC or the target charging amount in consideration of the tolerable charging frequency.

In this way, with the present invention, the target SOC or target charging amount is set in consideration of the bother of the charging work caused by an increase in the charging frequency. Therefore, it is possible to both suppress the battery deterioration and eliminate the bother of the battery charging work. As a result, the battery is not charged beyond what is necessary, and therefore it is possible to suppress the battery deterioration.

In the first aspect of the present invention, the chargeable amount acquiring section further acquires a low-cost charging amount (ΔSOC_lowcost) that is the chargeable amount that can be charged in the battery in the time period during which the electricity cost is relatively low; and the target setting section changes the tolerable charging frequency based on the low-cost charging amount and intent of the user.

Due to the above, the convenience of the battery charging work is improved.

In the first aspect of the present invention, the target setting section: calculates a minimum charging frequency (Nmin1) of the battery based on the low-cost charging amount; compares the minimum charging frequency to the tolerable charging frequency and sets the greater of the two as a target charging frequency (N_tar) of the battery; and sets the target SOC or the target charging amount in consideration of the target charging frequency.

In this case, the target SOC or target charging amount is set in consideration of the bother of the charging work caused by an increase in the charging frequency and of the normal lifestyle pattern of the user. Therefore, it is possible to realize both suppression of the battery deterioration and elimination of the bother of the battery charging work. As a result, the battery is not charged beyond what is necessary, and therefore it is possible to suppress cyclical deterioration.

In the first aspect of the present invention, the charging control apparatus further comprises a deterioration acceleration acquiring section (44) that acquires deterioration acceleration of the battery with respect to the SOC of the battery; and the target setting section identifies deterioration acceleration of the battery for the tolerable charging frequency and deterioration acceleration of the battery for the minimum charging frequency, based on the deterioration acceleration acquired by the deterioration acceleration acquiring section, and sets whichever charging frequency results in a lower deterioration acceleration as a target charging frequency for the battery; and the target setting section sets the target SOC or the target charging amount in consideration of the target charging frequency.

In this case, the target SOC or target charging amount is set in consideration of the bother of the charging work caused by an increase in the charging frequency, the normal lifestyle pattern of the user, and the minimum number of times charging must be performed. Therefore, it is possible to realize both suppression of the battery deterioration and elimination of the bother of the battery charging work. As a result, the battery is not charged beyond what is necessary, and therefore it is possible to suppress cyclical deterioration.

In the first aspect of the present invention, the charging control apparatus further comprises: a necessary charging amount estimating section (44) that estimates a necessary charging amount (ΔSOC_const1, ΔSOC_const2) that is necessary for the moving body in the following instance of driving, based on the drive history of the moving body; the necessary charging amount estimating section calculates a consumption amount (ΔSOC_drv1, ΔSOC_drv2) of the moving body on each day, from a transition in a usage history of the battery in the past corresponding to the drive history of the moving body, and estimates the necessary charging amount based on the consumption amount; and the minimum SOC calculating section calculates the minimum SOC based on the necessary charging amount.

Due to the above, the necessary charging amount can be accurately estimated. As a result, the minimum SOC can be accurately calculated.

In the first aspect of the present invention, the necessary charging amount estimating section predicts an average consumption amount (ΔSOC_drv1) of the moving body on each day, from the transition in the usage history of the battery, integrates the predicted average consumption amount over a prescribed interval, and calculates a first necessary charging amount (ΔSOC_const1) by dividing the integrated average consumption value (ΔSOC_drv1_integral) by the target charging frequency; the necessary charging amount estimating section predicts a maximum consumption amount (ΔSOC_drv2) of the moving body on each day as the consumption amount, from the transition in the usage history of the battery, and calculates a second necessary charging amount (ΔSOC_const2) from the predicted maximum consumption amount; and the minimum SOC calculating section calculates a first minimum SOC (SOC_min1) by adding the first necessary charging amount to the current SOC, calculates a second minimum SOC (SOC_min2) by adding the second necessary charging amount to a usage lower limit SOC, and selects whichever of the first minimum SOC and the second minimum SOC is greater as the minimum SOC.

Due to the above, it is possible to calculate the necessary charging amount in consideration of the charging frequency. As a result, it is possible to accurately determine the minimum SOC from the calculated necessary charging amount.

Accordingly, with the present invention, if the usage state of the moving body is a normal usage state such as during weekdays, the average consumption amount can be calculated using various statistical values, and the necessary charging amount can be calculated from the calculated average consumption amount. Furthermore, if the usage state of the moving body is a usage state that has a greater consumption amount than normal, such as travelling long distances on a weekend, the maximum consumption amount can be calculated using various statistical values, the necessary charging amount can be calculated using the calculated maximum consumption amount. As a result, with the present invention, it is possible to suitably set the target SOC or target charging amount according to the usage state of the moving body on a corresponding day of the week.

Due to the above, it is possible to control the charging of the battery such as described below, for example. (1) For a day that is on a weekend or a holiday, the battery is charged with a large charging amount. For a weekday, the battery is charged by a small charging amount. (2) If the following day is a weekday, the battery is charged by the maximum necessary charge amount needed among weekdays. (3) If the following day is a weekend or holiday, the battery is charged by the maximum necessary charge amount needed among weekend days and holidays. (4) In the case of any of (1) to (3) above, a high whisker value for the total number of days is obtained, and the maximum consumption amount is obtained from this high whisker value or the like. (5) There can be cases where the moving body is not driven on a weekend day or holiday. In such a case, (1) to (3) above may still be applied for the total number of days. (6) If there is a trend that the moving body is driving often on weekend days and holidays, the target SOC or target charging amount may be set to be high.

In the first aspect of the present invention, the chargeable amount acquiring section acquires a maximum charging amount (ΔSOC_max) that is a maximum amount that the battery can be charged within a time period from the charging startable timing to the scheduled drive timing; the target setting section calculates a maximum SOC (SOC_ max) by adding the low-cost charging amount or the maximum charging amount to the current SOC; and the target setting section sets the target SOC to be an SOC that suppresses deterioration of the battery and is greater than or equal to the minimum SOC and less than or equal to the maximum SOC, or sets the target charging amount to be a charging amount that suppresses deterioration of the battery and is greater than or equal to the necessary charging amount and less than or equal to the low-cost charging amount or the maximum charging amount.

Due to the above, it is possible to suitably set the target SOC or the target charging amount in consideration of the electricity cost.

In the first aspect of the present invention, the target setting section: if the second necessary charging amount is greater than or equal to the low-cost charging amount, sets the target charging amount in a manner to suppress deterioration of the battery and to be greater than or equal to the low-cost charging amount and less than or equal to the second necessary charging amount; and, if the second necessary charging amount is less than the low-cost charging amount, sets the target charging amount in a manner to suppress deterioration of the battery and to be greater than or equal to the first necessary charging amount or the second necessary charging amount and less than or equal to the low-cost charging amount.

Due to the above, it is possible to suitable set the target charging amount according to a relationship among the first necessary charging amount for covering driving of the moving body having the average consumption amount of a plurality of days, the second necessary charging amount for covering driving of the moving body having a large consumption amount on the following day, and the low-cost charging amount.

In the first aspect of the present invention, the target setting section sets the target SOC or the target charging amount such that the target SOC is greater than or equal to the minimum SOC and in an SOC region where deterioration of the battery is suppressed.

Due to the above, it is possible to favorably suppress the acceleration of battery deterioration.

A second aspect of the present invention is a moving body comprising the charging control apparatus described above and a battery.

With this invention as well, each of the effects described above can be easily realized.

A third aspect of the present invention is a charging control system (14) comprising the charging control apparatus described above and a battery.

With this invention as well, each of the effects described above can be easily realized.

A fourth aspect of the present invention is a charging control method for controlling charging of a battery from an external power source, comprising: a step (steps S9, S19) of, when a moving body possessing the battery is driven by power supplied from the battery, acquiring, with a chargeable amount acquiring section, a chargeable amount that is an amount the battery can be charged within a time period from a charging startable timing of the battery to a scheduled drive timing of the moving body; a step (steps S35 to S37) of calculating, with a minimum SOC calculating section, a minimum SOC that is the lowest SOC needed by the moving body for the following instance of driving, based on a drive history of the moving body; and a step (step S41) of setting, with a target setting section, a target charging amount that suppresses deterioration of the battery and is greater than or equal to the minimum SOC, or a target charging amount that suppresses deterioration of the battery and is less than or equal to the chargeable amount.

With this invention as well, each of the effects described above can be easily realized.

What is claimed is:

1. A charging control apparatus that controls charging from an external power source to a battery, comprising one or more processors that execute computer-executable instructions stored in a memory, wherein in a case where a moving body possessing the battery is driven by power supplied from the battery, the one or more processors execute the computer-executable instructions to cause the charging control apparatus to:
   acquire a chargeable amount that is an amount the battery can be charged within a time period from a charging startable timing of the battery to a scheduled drive timing of the moving body;
   calculate a minimum state of charge that is a lowest state of charge needed by the moving body for a following instance of driving, based on a drive history of the moving body; and
   set a target state of charge that suppresses deterioration of the battery and is greater than or equal to the minimum state of charge, or a target charging amount that suppresses deterioration of the battery and is less than or equal to the chargeable amount.

2. The charging control apparatus according to claim 1, wherein the one or more processors cause the charging control apparatus to:
   acquire an electricity cost of the external power source, and
   set the target state of charge or the target charging amount such that the battery is charged in a time period during which the electricity cost is relatively low.

3. The charging control apparatus according to claim 2, wherein the one or more processors cause the charging control apparatus to
   acquire a tolerable charging frequency of the battery that can be tolerated by a user of the moving body, and
   set the target state of charge or the target charging amount in consideration of the tolerable charging frequency.

4. The charging control apparatus according to claim 3, wherein the one or more processors cause the charging control apparatus to:
   acquire a low-cost charging amount that is the chargeable amount that can be charged in the battery in the time period during which the electricity cost is relatively low; and
   change the tolerable charging frequency based on the low-cost charging amount and intent of the user.

5. The charging control apparatus according to claim 4, wherein the one or more processors cause the charging control apparatus to:
   calculate a minimum charging frequency of the battery based on the low-cost charging amount;
   compare the minimum charging frequency to the tolerable charging frequency and set a greater of the minimum charging frequency and the tolerable charging frequency as a target charging frequency of the battery; and
   set the target state of charge or the target charging amount in consideration of the target charging frequency.

6. The charging control apparatus according to claim 5, wherein the one or more processors cause the charging control apparatus to:
   acquire deterioration acceleration of the battery with respect to a state of charge of the battery, wherein;

identify deterioration acceleration of the battery for the tolerable charging frequency and deterioration acceleration of the battery for the minimum charging frequency, based on the deterioration acceleration, and set whichever charging frequency results in a lower deterioration acceleration as a target charging frequency for the battery; and set the target state of charge or the target charging amount in consideration of the target charging frequency.

7. The charging control apparatus according to claim 5, wherein the one or more processors cause the charging control apparatus to:

estimate a necessary charging amount that is necessary for the moving body in the following instance of driving, based on the drive history of the moving body;

calculate a consumption amount of the moving body on each day, from a transition in a usage history of the battery in a past corresponding to the drive history of the moving body, and estimates the necessary charging amount based on the consumption amount; and calculate the minimum state of charge based on the necessary charging amount.

8. The charging control apparatus according to claim 7, wherein the one or more processors cause the charging control apparatus to:

predict an average consumption amount of the moving body on each day, from the transition in the usage history of the battery, integrate the predicted average consumption amount over a prescribed interval, and calculate a first necessary charging amount by dividing the integrated average consumption value by the target charging frequency;

predict a maximum consumption amount of the moving body on each day as the consumption amount, from the transition in the usage history of the battery, and calculate a second necessary charging amount from the predicted maximum consumption amount; and calculate a first minimum state of charge by adding the first necessary charging amount to the current state of charge, calculate a second minimum state of charge by adding the second necessary charging amount to a usage lower limit state of charge, and select whichever of the first minimum state of charge and the second minimum state of charge is greater as the minimum state of charge.

9. The charging control apparatus according to claim 8, wherein the one or more processors cause the charging control apparatus to:

acquire a maximum charging amount that is a maximum amount that the battery can be charged within a time period from the charging startable timing to the scheduled drive timing;

calculate a maximum state of charge by adding the low-cost charging amount or the maximum charging amount to the current state of charge; and set the target state of charge to be an state of charge that suppresses deterioration of the battery and is greater than or equal to the minimum state of charge and less than or equal to the maximum state of charge, or set the target charging amount to be a charging amount that suppresses deterioration of the battery and is greater than or equal to the necessary charging amount and less than or equal to the low-cost charging amount or the maximum charging amount.

10. The charging control apparatus according to claim 8, wherein if the second necessary charging amount is greater than or equal to the low-cost charging amount, the one or more processors cause the charging control apparatus to set the target charging amount in a manner to suppress deterioration of the battery and to be greater than or equal to the low-cost charging amount and less than or equal to the second necessary charging amount; and if the second necessary charging amount is less than the low-cost charging amount, the one or more processors cause the charging control apparatus to set the target charging amount in a manner to suppress deterioration of the battery and to be greater than or equal to the first necessary charging amount or the second necessary charging amount and less than or equal to the low-cost charging amount.

11. The charging control apparatus according to claim 1, wherein the one or more processors cause the charging control apparatus to:

set the target state of charge or the target charging amount such that the target state of charge is greater than or equal to the minimum state of charge and in an state of charge region where deterioration of the battery is suppressed.

12. A moving body comprising the charging control apparatus that controls charging from an external power source to a battery and a battery, wherein the charging control apparatus comprises one or more processors that execute computer-executable instructions stored in a memory, wherein in a case where a moving body possessing the battery is driven by power supplied from the battery, the one or more processors execute the computer-executable instructions to cause the charging control apparatus to:

acquire a chargeable amount that is an amount the battery can be charged within a time period from a charging startable timing of the battery to a scheduled drive timing of the moving body;

calculate a minimum state of charge that is the lowest state of charge needed by the moving body for the following instance of driving, based on a drive history of the moving body; and set a target state of charge that suppresses deterioration of the battery and is greater than or equal to the minimum state of charge, or a target charging amount that suppresses deterioration of the battery and is less than or equal to the chargeable amount.

13. A charging control system comprising the charging control apparatus that controls charging from an external power source to a battery and a battery, wherein the charging control apparatus comprises one or more processors that execute computer-executable instructions stored in a memory, wherein in a case where a moving body possessing the battery is driven by power supplied from the battery, the one or more processors execute the computer-executable instructions to cause the charging control apparatus to:

acquire a chargeable amount that is an amount the battery can be charged within a time period from a charging startable timing of the battery to a scheduled drive timing of the moving body;

calculate a minimum state of charge that is a lowest state of charge needed by the moving body for a following instance of driving, based on a drive history of the moving body; and set a target state of charge that suppresses deterioration of the battery and is greater than or equal to the minimum state of charge, or a target charging amount that suppresses deterioration of the battery and is less than or equal to the chargeable amount.

14. A charging control method for controlling charging of a battery from an external power source in a case where a moving body possessing the battery is driven by power supplied from the battery, comprising:
- acquiring a chargeable amount that is an amount the battery can be charged within a time period from a charging startable timing of the battery to a scheduled drive timing of the moving body;
- calculating a minimum state of charge that is a lowest state of charge needed by the moving body for a following instance of driving, based on a drive history of the moving body; and
- setting a target state of charge that suppresses deterioration of the battery and is greater than or equal to the minimum state of charge, or a target charging amount that suppresses deterioration of the battery and is less than or equal to the chargeable amount.

* * * * *